United States Patent [19]
Zitzloff

[11] 4,343,456
[45] Aug. 10, 1982

[54] PLASTIC CONTROL VALVE

[75] Inventor: Wayne D. Zitzloff, Brooklyn Center, Minn.

[73] Assignee: Galtek Corporation, Chaska, Minn.

[21] Appl. No.: 150,326

[22] Filed: May 16, 1980

[51] Int. Cl.³ .......................................... F16K 31/524
[52] U.S. Cl. ...................................... 251/255; 74/57; 251/256; 251/288; 251/335 A; 251/263
[58] Field of Search .............. 74/55, 56, 57; 251/251, 251/252, 257, 258, 284, 263, 288, 335 A, 368, 331, 255, 256, 253, 254

[56] References Cited

U.S. PATENT DOCUMENTS

| | | | |
|---|---|---|---|
| 888,455 | 5/1908 | Atkiss et al. | 74/56 |
| 1,511,566 | 10/1924 | Kollock | 74/56 |
| 2,035,202 | 3/1936 | Smith | 251/263 |
| 2,089,977 | 8/1937 | Marchant | 251/331 |
| 2,096,528 | 10/1937 | Saunders | 251/256 |
| 2,510,393 | 6/1950 | Fraser et al. | 251/256 |
| 2,575,775 | 11/1951 | Tecters | 251/335 A |
| 2,579,982 | 12/1951 | Trump | 251/256 |
| 2,603,445 | 7/1952 | Marchant | 251/331 |
| 2,646,248 | 7/1953 | Cornelius | 251/263 |
| 3,390,921 | 7/1968 | Klimek | 251/263 |
| 3,743,245 | 7/1973 | Demler, Sr. | 251/331 |
| 3,929,317 | 12/1975 | Cohn et al. | 251/288 |
| 4,014,514 | 3/1977 | Priese et al. | 251/331 |
| 4,076,209 | 2/1978 | Kilgariff | 251/251 |
| 4,180,239 | 12/1979 | Valukis | 251/335 A |

FOREIGN PATENT DOCUMENTS 1920468 3/1971 Fed. Rep. of Germany ...... 251/263

Primary Examiner—George L. Walton
Attorney, Agent, or Firm—H. Dale Palmatier

[57] ABSTRACT

A control valve with a three part, all plastic housing having an access opening through which a slide extends for operating the plastic valve element toward and away from the valve seat, the plastic valve element having an integrally molded plastic diaphragm clamped between parts of the all plastic housing and traversing the entire access opening, the slide being operated by a rotor, there being ramp shaped surfaces on confronting faces of the rotor and slide, and an adjustment nut for locating the rotor, slide and valve element relative to the valve seat.

3 Claims, 7 Drawing Figures

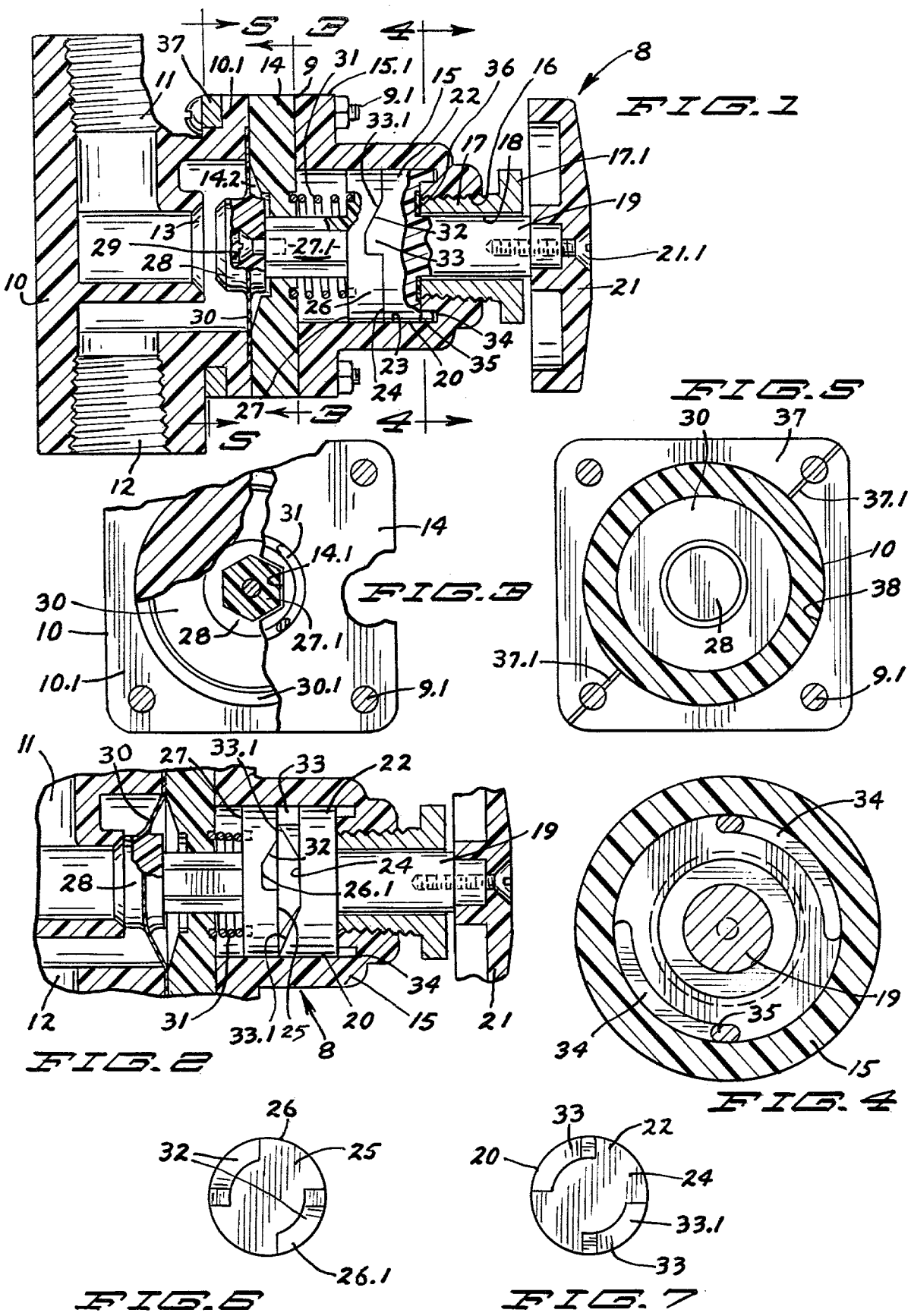

PLASTIC CONTROL VALVE

This invention relates to a plastic control valve, and more particularly, to a fast action valve requiring a minimum of manual manipulation between fully open and fully closed conditions.

BACKGROUND OF THE INVENTION

The handling of flowing fluids which are highly corrosive requires the minimizing of the corrosive effect of such fluids. In the past, various attempts have been made to deal with this problem and in some instances plastic liners have been utilized in control valves which are otherwise conventional. However, the prior art has not successfully solved the problem of controlling the flow of such fluids.

SUMMARY OF THE INVENTION

An object of the invention is to provide a new and improved valve which will stand up to the deteriorating influences of highly corrosive fluids.

Another object of the invention is to provide a novel valve wherein the principal parts are injection molded of rigid plastic and which valve will change between fully open and fully closed conditions with a minimum of rotary motion of the valve handle.

Still another object of the invention is the construction of an improved valve which is substantially entirely constructed of inert plastics to resist the effects of fluids which contain highly corrosive or highly active materials.

A further object of the invention is to provide a new and improved valve which sealingly isolates the fluid flow passages and the valving parts therein from the operating parts of the valve.

A feature of the invention is the provision of a flow control valve wherein all of the essential parts are molded of plastic of a type which is highly resistant to the deteriorating effects of highly active or corrosive materials in the fluids controlled by the valve.

Another feature of the invention is the provision of a flow valve wherein the molded plastic valve element, which moves against and away from the valve seat in the flow passage, is formed integrally of a flexible diaphragm molded in one piece with and of the same plastic as the valve element, and which diaphragm has its periphery clamped and sealed to the valve housing to prevent migration of the flowing fluids into remote portions of the valve.

A further feature of the invention is the provision of a two part operator for the plastic valve wherein the manual control is rotatable and the valve element moves without rotating, toward and away from the valve seat. The valve element is restrained from rotating by the diaphragm on the valve element which is clamped in the housing, and by the non-circular stem which slides through a corresponding non-circular bearing aperture on the valve housing.

Still another feature of the invention is the provision, in a plastic valve, of a fast action feature to move the valve element entirely between fully open and fully closed positions with only a quarter turn of the valve handle; the handle having a rotary part with a ramp shaped insert which fits into a recess of a non-rotary slide which defines another ramp shaped surface to respond to rotation of the insert and be moved endways thereby, to close the valve.

The advantages of the present invention include the successful valving, over a long period of time, of fluids which may be of a highly corrosive nature without any deteriorating effect. Another advantage is the operating of the valve with a minimum of input rotary motion. The valve will successfully control the flow of both fluids and gases over a wide range of pressures and vacuum conditions from substantially 27 inches of mercury vacuum to pressures of 60 pounds per square inch. The valve has been successfully pressure tested to at least 400 psi.

DESCRIPTION OF THE DRAWINGS

FIG. 1 is a longitudinal section view through the valve with portions thereof broken away from clarity of detail.

FIG. 2 is a detail section view similar to FIG. 1, but showing the valve in fully closed condition.

FIG. 3 is a detail section view taken approximately at 3—3 in FIG. 1.

FIG. 4 is an enlarged detail section view taken approximately at 4—4 in FIG. 1.

FIG. 5 is a detail section view taken approximately at 5—5 in FIG. 1.

FIG. 6 is a detail end elevation view of one end of the slide.

FIG. 7 is a detail end elevation view of the rotor.

DETAILED SPECIFICATION

One form of the invention is illustrated in the drawings and is described herein. The control valve is indicated in general by numeral 8 and includes a substantially rigid valve body 9 which is formed in three separate and distinct parts, each of which is molded entirely of plastic. The lower valve body or passage housing 10 defines the flow passages 11 and 12, and a valve seat 13. The valve seat 13 is oriented substantially perpendicular of the threaded portions of the flow passages 11 and 12 and faces the open side of the passage housing, and adjacent the peripheral flange 10.1.

The valve body 9 also includes a retainer plate 14, also molded of plastic and lying flush against the peripheral flange 10.1 around the open side of the lower passage housing 10.

The retainer plate 14 has an access opening 14.1 therein which is of hexagonal shape and defines a bearing aperture. The retainer plate 14 also has a recess 14.1 facing generally toward the valve seat 13 and concentric of the access opening.

The valve body 9 also includes an upper valve body or shroud 15, formed entirely of molded plastic and having a mounting flange 15.1 lying flush against the retainer plate 14. The retainer plate 14 is sandwiched between the two flanges 10.1 and 15.1 of the lower and upper valve bodies, which are all clamped together by a plurality of bolts 9.1. The upper valve body is generally circular in configuration, and has a threaded opening 16 at its outer end in which an adjustment nut 17 is mounted. The adjustment nut 17 has an upper flange 17.1 which has an octagonally shaped outer periphery to accommodate turning the nut with a wrench.

The nut 17 has a concentric circular opening 18 therein to confine the stem 19 of the rotor 20 which is confined in the upper valve housing 15. An operating handle, also molded of plastic, is attached to the stem 19 by a metal screw 21.1.

The rotor 20 has a rotary head 22 formed integrally and molded in one piece with the stem 19, and the head 22 is rotatably confined in the interior chamber 23 of the upper valve housing.

The head 22 of the rotor has a substantially flat end face 24 which confronts the outer end face 25 on the head 26 of the slide 27. Slide 27 also includes a stem 27.1 which has a hexagonal outer peripheral shape corresponding to the hexagonal shape of the bearing aperture 14.1 in the retainer plate 14. The stem 27.1 and head 26 of the slide 27 are integrally molded in one piece of plastic.

A plastic valve element 28 confronts the valve seat 13 in concentric relation therewith and is secured to the inner end of valve stem 27.1 by a screw 29 which is encapsulated within the valve element 28. The valve element 28 is received in the recess 14.2 of the retainer plate 14 when the valve is in open condition so as to maximize the flow through the passages.

The valve element 28 has a peripheral diaphragm 30 molded in integral and one piece with the valve element 28.

It will be seen that the outer periphery 30.1 of the diaphragm is clamped between the flange 10.1 of the lower valve body and the retainer plate 14. The diaphragm is thereby entirely sealed to the valve body and across the access opening 14.1 through which the slide extends.

A coil spring 31 embraces the sstem 27.1 of the slide, is anchored against the retainer plate 14 and bears against the head 26 of the slide to continuously urge the slide and valve element 28 away from the valve seat 13.

The head 26 of the slide has a pair of generally arcuate shaped recesses 26.1 formed in the front face 25 thereof and defining inclined ramp surfaces 32 extending generally arcuately along the circular periphery of the head.

The rotor 20 has a pair of camming inserts 33 which are generally arcuately shaped, adjacent the periphery of the rotor 20, as best seen in FIG. 7. The camming inserts 33 define ramp surfaces 33.1, which are of similar shape to the ramp surfaces 32 on the slide so that the camming inserts 33 are snugly received in the recesses 26.1 when the valve is open as illustrated in FIG. 1.

It will be recognized that, as the rotor 20 is rotated from the position illustrated in FIG. 1, to the position illustrated in FIG. 2, the camming inserts 33 of the rotor will be rotated out of the recesses 26.1. As the camming inserts 33 are rotated relative to the slide 27, the cooperating ramp surfaces 32 and 33.1 cause the slide 27 to move longitudinally toward the valve seat 13, and move the valve element 28 into sealing engagement with the valve seat. During this movement of the valve element 28, the diaphragm 30 flexes into the position illustrated in FIG. 2 and continues to isolate the flow passages 11 and 12 from the interior chamber 23 of the upper valve body and the operating parts therein.

The upper valve body 15 also has a pair of arcuate slots 34 which extend peripherally through an arc of approximately 90°. Lugs 35 on the head 22 of the rotor 20 project into the slots 34 such that the lugs 35 and the portions of the valve body at the ends of the slots 34 form stops which restrain further rotation of the rotor 20. By the nature and shape of the ramp surfaces 33.1 and 32 on the rotor and slide, respectively, the valve is moved from a fully closed condition to a fully open condition by a mere one quarter turn of the handle 21 and rotor 20.

A plastic washer 36 is located between the end of the adjustment nut 17 and the annular shoulder surface of the rotor head 22. The washer 36 is molded of a relatively slippery plastic to permit ease of operation of the rotor.

Although other plastics may be suitable, it is preferred to mold certain of the valve parts from PFA, otherwise known as perfluoroalkoxy, also known by its trademark Teflon 340 or 350. This material has a low coefficient of friction and is preferably used in the lower valve body or passage housing 10, including the valve seat 13; the valve element 28 and the diaphragm 30 which is formed integrally therewith; and the plastic washer 36.

The remainder of the plastic molded parts of the valve are molded from a plastic known as ECTFE, otherwise known as ethylene-chlorotrifluoroethylene, and also known by its registered trademark Halar.

In order to stiffen the lower valve body 10 and the valve seat 13, to prevent warpage and leakage by the valve, rigid metal plates 37 lie against the back side of flange 10.1 and have inner peripheries 38 which follow the contour of the adjacent valve body. The plates confront each other at their ends and adjacent the corners of the flanges as indicated at 37.1. The clamping bolts 9.1 clamp the plates 37 against the flanges and rigidify the valve as a whole.

It will be recognized that, as the handle 21 is turned through approximately 90°, the valve is operated between the extremes of its open and closed conditions. The adjustment nut 17 may be turned inwardly or outwardly slightly in order to assure that proper tension is exerted against the valve seat by the valve element 28 when the valve is to be in closed condition.

During operation of the valve, the slide 27 is prevented from rotating by the hexagonal bearing aperture 14.1, and also by the diaphragm which is clamped between the lower valve housing and the retainer plate 14.

The valve is used to control both liquids and gases and may be operated over a wide range of pressures and vacuum conditions, from approximately 27 inches of mercury vacuum conditions to at least 60 psi. The valve has been successfully tested to pressures as high as 400 psi and has operated satisfactorily.

What is claimed is:

1. A control valve for flowing fluids, comprising
    a plastic valve body having a flow passage for flowing fluids and including a valve seat, the valve body having an access opening opposite the valve seat,
    a plastic valve element movable toward and away from the valve seat, the valve element having a flexible sealing diaphragm thereon around the periphery thereof, the diaphragm and valve element traversing the access opening and the outer edge of the diaphragm being entirely sealed against the valve body to isolate the access opening at one side of the diaphragm from the fluids adjacent the valve seat at the other side of the diaphragm, the diaphragm flexing to accommodate movement of the valve element toward and away from the valve seat,
    a plastic operating slide extending through the access opening and having an inner end connected to the valve element and also having an outer end with an end face, the slide being slidably movable endways through the access opening for moving the valve element toward and away from the valve seat, and
    a plastic control rotor on the valve body and turning about a rotation axis extending in the direction of the sliding movement of the slide, the control rotor having an end face traversing the rotation axis and confronting the end face of the slide, said end faces having cooperating cam and follower means spaced from the rotation axis and producing endways sliding of the operating slide in response to turning of the control rotor, the cam and follower means including an elongate ramp on one end face and spaced from the rotation axis and said cam and follower means also including an engaging part bearing against the ramp, the elongate ramp and engaging part being relatively rotatable in response to turning of the rotor to produce endways sliding of the slide and movement of the valve element, and the control rotor having an annular shoulder facing away from the slide, and an adjustment nut threaded into the valve body, the nut embracing the rotor and bearing against the annular shoulder of the control rotor for accurately positioning the rotor, slide and valve element relative to the valve seat.

2. A control valve for flowing fluids, comprising a plastic valve body having a flow passage for flowing fluids and including a valve seat, the valve body having an access opening aligned with the valve seat, the valve body including a plastic passage housing with an open side and also including a plastic retainer plate traversing the open side of the passage housing, the passage housing having a peripheral flange around the open side thereof, the flange having a front side confronting the retainer plate and cooperating therewith in clamping the periphery of the diaphragm therebetween, and bolt means clamping the flange and retainer plate together, a plastic valve element movable toward and away from the valve seat, the valve element having a flexible sealing diaphragm thereon around the periphery thereof, the diaphragm and valve element traversing the access opening and the outer edge of the diaphragm being entirely sealed against the valve body to isolate the access opening at one side of the diaphragm from the fluids adjacent the valve seat at the other side of the diaphragm, the diaphragm flexing to accommodate movement of the valve element toward and away from the valve seat, a plastic operating slide extending through the access opening and having an inner end connected to the valve element and also having an outer end with an end face, the slide being slidably movable endways through the access opening for moving the valve element toward and away from the valve seat, and a plastic control rotor on the valve body and turning about a rotation axis extending in the direction of the sliding movement of the slide, the control rotor having an end face traversing the rotation axis and confronting the end face of the slide, said end faces having cooperating cam and follower means spaced from the rotation axis and producing endways sliding of the operating slide in response to turning of the control rotor, and the flange also has a rear side, and a rigid metal stiffener plate bearing and clamped against the rear side of the flange and preventing warping of the plastic valve body.

3. A control valve for flowing fluids, comprising a plastic valve body including a plastic passage housing defining a flow passage for the fluids and also defining a valve seat intermediate the flow passage, the passage housing defining an interior chamber adjacent the valve seat and having an open side, the passage housing defining a peripheral flange around the open side thereof, the plastic valve body also including a plastic retainer plate traversing the open side of the passage housing, and confining the interior passage thereof, said retainer plate having an access opening therethrough and substantially aligned with the valve seat in the passage housing, the plastic valve body also including a plastic retainer shroud bearing against the retainer plate, a plastic valve element in the interior chamber of the passage housing and adjacent the valve seat and being movable toward and away from the valve seat, the valve element having a flexible sealing diaphragm molded integrally and in one piece therewith and extending outwardly of the periphery of the valve element, the outer periphery of the valve element being clamped in sealing relation between the peripheral flange of the passage housing and the retainer plate, a plastic operating slide having a stem extending through the access opening of the retainer plate and secured to the valve element, the stem having a hexagonal peripheral shape corresponding to the hexagonal peripheral shape of the access opening, the plastic operating slide also having an enlarged head confined within the retainer shroud, the enlarged head of the slide having an end face facing away from the valve element and being provided with a pair of recesses therein, each defining a camming ramp surface, oblique to the slide, a return spring anchored against the retainer plate and bearing against the head of the slide and urging the slide and valve element away from the valve seat, a plastic rotor also confined within the retainer shroud and having an end face confronting the end face of the slide head, the motor having a pair of inserts defining ramp surfaces and fitting into the recesses of the slide head whereby to produce sliding movement of the slide and valve element in response to rotation of the rotor, the rotor having a rotation axis extending longitudinally through the slide and in spaced relation with said ramps, and the rotor having a stem extending endways outwardly of the shroud and also having shoulder surfaces adjacent the stem, and a rotary adjustment nut threaded into the shroud and embracing the stem of the rotor and bearing against the shoulder surface of the rotor to accurately position the rotor slide and valve element relative to the valve body, and a handle on the stem of the rotor for turning the rotor and producing operation of the valve, the shroud having a pair of arcuate grooves adjacent the shoulder surface of the rotor, the arcuate grooves extending through an arc of approximately 90°, and a pair of stop lugs on the shoulder surface of the rotor and extending into the arcuate grooves to limit the rotary movement of the rotor, whereby the valve element may move between its extremes to open and close the passages within a quarter turn of the handle and rotor.

* * * * *

UNITED STATES PATENT AND TRADEMARK OFFICE
CERTIFICATE OF CORRECTION

PATENT NO. : 4,343,456
DATED : August 10, 1982
INVENTOR(S) : Wayne D. Zitzloff

It is certified that error appears in the above-identified patent and that said Letters Patent are hereby corrected as shown below:

Column 2, line 15, delete "from" and substitute --for--.

Column 3, line 27, delete "sstem" and substitute --stem--.

Column 6, line 43, delete "motor" and substitute --rotor--.

Signed and Sealed this

Fifth Day of October 1982

[SEAL]

Attest:

GERALD J. MOSSINGHOFF

Attesting Officer    Commissioner of Patents and Trademarks